US010429193B2

(12) United States Patent
Shen et al.

(10) Patent No.: US 10,429,193 B2
(45) Date of Patent: Oct. 1, 2019

(54) METHOD AND APPARATUS FOR GENERATING HIGH PRECISION MAP

(71) Applicant: Baidu Online Network Technology (Beijing) Co., Ltd., Beijing (CN)

(72) Inventors: Lixia Shen, Beijing (CN); Tianlei Zhang, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 435 days.

(21) Appl. No.: 15/281,201

(22) Filed: Sep. 30, 2016

(65) Prior Publication Data

US 2017/0343362 A1 Nov. 30, 2017

(30) Foreign Application Priority Data

May 30, 2016 (CN) .......................... 2016 1 0371676

(51) Int. Cl.

| | |
|---|---|
| ***G01C 21/32*** | (2006.01) |
| ***G06N 20/00*** | (2019.01) |
| ***G01C 21/36*** | (2006.01) |
| ***G06T 15/20*** | (2011.01) |
| ***G06K 9/00*** | (2006.01) |
| ***G01S 17/89*** | (2006.01) |
| ***G06K 9/62*** | (2006.01) |

(52) U.S. Cl.

CPC ......... *G01C 21/32* (2013.01); *G01C 21/3694* (2013.01); *G06K 9/00791* (2013.01); *G06N 20/00* (2019.01); *G06T 15/205* (2013.01); *G01S 17/89* (2013.01); *G06K 9/6218* (2013.01)

(58) Field of Classification Search

CPC ......... G01S 17/42; G01S 17/89; G01C 21/32; G01C 21/3667; G01C 21/3673; G01C 21/3694

See application file for complete search history.

(56) References Cited

U.S. PATENT DOCUMENTS 8,488,877 B1 * 7/2013 Owechko ........... G06K 9/00704 382/103

9,489,635 B1 * 11/2016 Zhu .................... G06K 9/00805

(Continued)

*Primary Examiner* — Eric L Bolda

(74) *Attorney, Agent, or Firm* — Lathrop Gage LLP

(57) ABSTRACT

The present application discloses a method and an apparatus for generating a high precision map. According to an embodiment, the method comprises: acquiring three-dimensional (3D) laser point cloud data and information related to a grid map for generating the high precision map; determining position information of each piece of the 3D laser point data of the 3D laser point cloud data in the grid map; rendering each pixel point in the grid map, by using the reflection value of corresponding 3D laser point data of the 3D laser point cloud data, in order to generate each of grid images in the grid map; identifying, by using a machine learning algorithm, traffic information of each of the grid images in the grid map; clustering the traffic information of each of the grid images in the grid map to obtain the traffic information of the grid map; and loading the traffic information of the grid map into the grid map to generate the high precision map. The embodiment implements the generating of a high precision map with a high precision and a plurality of dimensions.

15 Claims, 6 Drawing Sheets

(56) References Cited

U.S. PATENT DOCUMENTS

| | | | | |
|---|---|---|---|---|
| 2011/0164037 A1* | 7/2011 | Yoshida | G06T 15/08 | 345/419 |
| 2012/0056899 A1* | 3/2012 | Stroila | G01C 21/32 | 345/634 |
| 2012/0116678 A1* | 5/2012 | Witmer | G01C 21/32 | 702/5 |
| 2016/0358349 A1* | 12/2016 | Dorum | G01C 21/26 | |
| 2017/0213339 A1* | 7/2017 | Hibbard | G06T 7/38 | |
| 2017/0307735 A1* | 10/2017 | Rohani | G01S 7/417 | |
| 2018/0218214 A1* | 8/2018 | Pestun | G06K 9/0063 | |

* cited by examiner

METHOD AND APPARATUS FOR GENERATING HIGH PRECISION MAP

CROSS-REFERENCES TO RELATED APPLICATIONS

This application is related to and claims priority to Chinese Application No. 201610371676.0, filed on May 30, 2016, entitled "METHOD AND APPARATUS FOR GENERATING HIGH PRECISION MAP," the entire disclosure of which is hereby incorporated by reference.

TECHNICAL FIELD

The present application relates to the field of computer technology, specifically to the field of electronic map, and more specifically to a method and an apparatus for generating a high precision map.

BACKGROUND

Electronic maps become increasingly popular with the development of science and technology. On one hand, people can navigate by using electronic maps to facilitate the traveling. One the other hand, with the rise of driverless vehicles, the driverless vehicles can recognize surrounding environment by using electronic maps, thereby controlling behaviours of the driverless vehicles, such as steering, acceleration or deceleration.

With regard to the existing electronic map data, a raw map is usually obtained by satellite surveying and mapping, and the navigation map information is manually and periodically updated. Following problems exist. The precision is low, and errors are generally in the range of meters or even tens of meters. Dimensionality of the data is insufficient. For example, information in various dimensions such as road lane marking information, height information, road shape information, road slope information, road curvature information, road direction information, lane width information, crash barrier information, or road border information, is absent. Data generating efficiency is low and a lot of manual operations are needed.

SUMMARY

An objective of the present application is to provide an improved method and apparatus for generating a high precision map in order to solve the technical problems mentioned in the BACKGROUND.

In a first aspect, the present application provides a method for generating a high precision map. The method comprises: acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising: a row number and a column number of the grid map; a unit pixel length of the grid map indicating a physical length represented by one pixel in the grid map; and a horizontal pixel number and a vertical pixel number of each of the grid images in the grid map; determining, according to the 3D coordinate of the 3D laser point data and the information related to the grid map, position information of each piece of the 3D laser point data of the 3D laser point cloud data in the grid map, the position information comprising: a row value and a column value of a grid image, where the 3D laser point data is located, in the grid map; and a coordinate of the 3D laser point data in the grid map; rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map; identifying, by using a machine learning algorithm, traffic information of each of the grid images in the grid map, the traffic information comprising at least one of road shape information, road slope information, road curvature information, road direction information, lane width information, crash barrier information, road border information, lane marking information, and guiding line information; clustering, by using a machine learning algorithm in combination with position relations among each of the grid images in the grid map, the traffic information of each of the grid images in the grid map, in order to obtain the traffic information of the grid map; and loading the traffic information of the grid map into the grid map to generate the high precision map.

In a second aspect, the present application provides an apparatus for generating a high precision map. The apparatus comprises: an acquisition unit for acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising: a row number and a column number of the grid map; a unit pixel length of the grid map indicating a physical length represented by one pixel in the grid map; and a horizontal pixel number and a vertical pixel number of each of the grid images in the grid map; a determination unit for determining, according to the 3D coordinate of the 3D laser point data and the information related to the grid map, position information of each piece of the 3D laser point data of the 3D laser point cloud data in the grid map, the position information comprising: a row value and a column value of a grid image, where the 3D laser point data is located, in the grid map; and a coordinate of the 3D laser point data in the grid map; a rendering unit for rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map; an identification unit for identifying, by using a machine learning algorithm, traffic information of each of the grid images in the grid map, the traffic information comprising at least one of road shape information, road slope information, road curvature information, road direction information, lane width information, crash barrier information, road border information, lane marking information, and guiding line information; a clustering unit for clustering, by using a machine learning algorithm in combination with position relations among each of the grid images in the grid map, the traffic information of each of the grid images in the grid map, in order to obtain the traffic information of the grid map; and a generating unit for generating the high precision map by loading the traffic information of the grid map into the grid map.

The method and apparatus for generating a high precision map as provided in the present application implements the generating of a high precision map with a high precision and a plurality of dimensions. This is implemented by acquiring 3D laser point cloud data as an input; mapping the 3D laser point cloud data to each of the grid images in the grid map; rendering, by using the reflection value of each of the 3D laser point data of the 3D laser point cloud data, the corresponding pixel points in the grid images in the corresponding grid map; extracting the traffic information in each of the grid images; clustering the traffic information in each of the grid images to obtain the traffic information of the grid map; and loading the traffic information into the grid map to generate the high precision map.

BRIEF DESCRIPTION OF THE DRAWINGS

Other features, objects, and advantages of the present application will become more apparent from the detailed description of the non-limiting embodiments made in reference to the accompany drawings, in which.

DETAILED DESCRIPTION

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
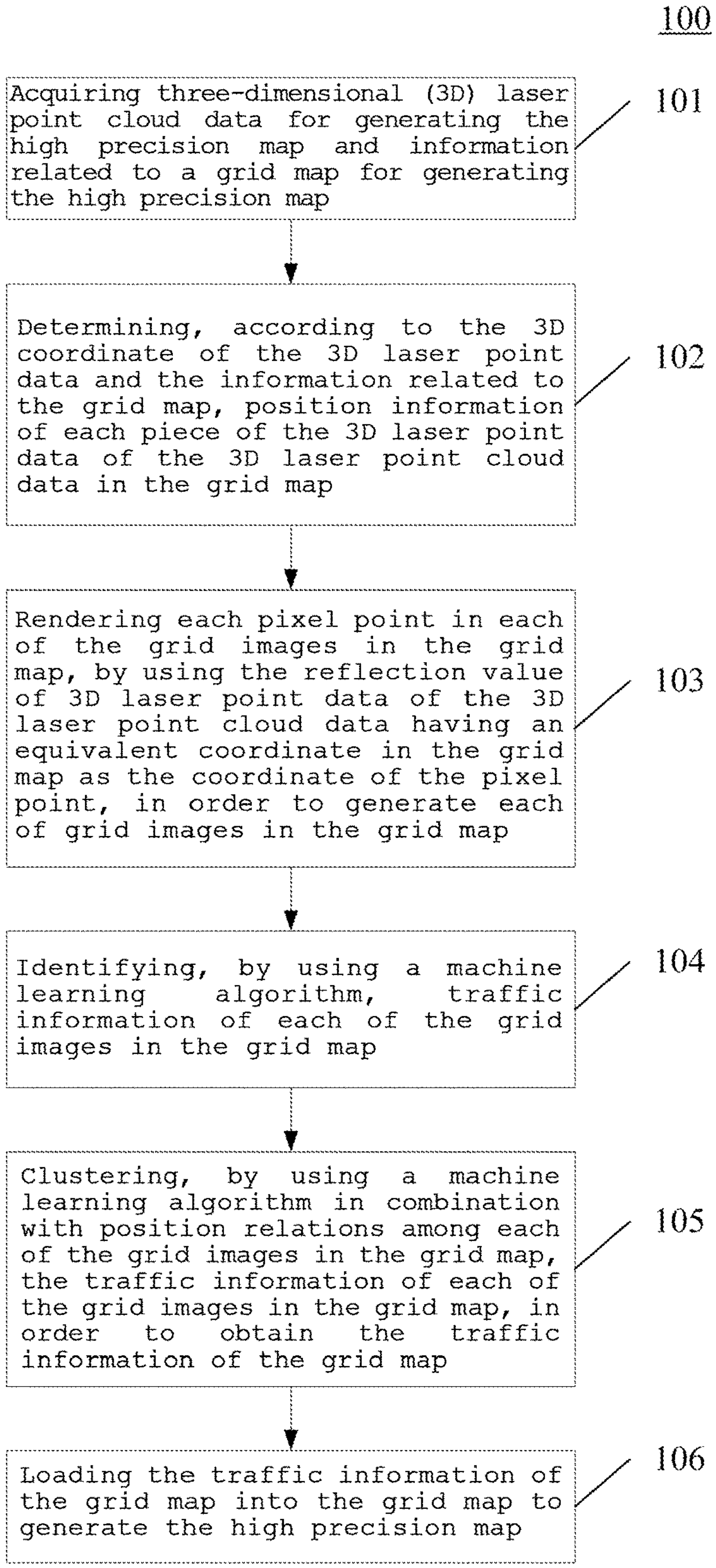
FIG. 1 is a flow chart of a method for generating a high precision map according to an embodiment of the present application.

Referring to FIG. 1, it shows a flowchart 100 of a method for generating a high precision map according to an embodiment of the present application. The method for generating the high precision map comprises the following steps.

At step 101, three-dimensional (3D) laser point cloud data for generating the high precision map and information related to a grid map for generating the high precision map are acquired.

In this embodiment, the 3D laser point cloud data for generating the high precision map may be captured and processed by a laser scanner, and then stored locally in an electronic device on which the method for generating the high precision map runs, or stored in another electronic device connected to the electronic device. In this way, the electronic device may acquire, locally or remotely, the 3D laser point cloud data for generating the high precision map. Specifically, the 3D laser point cloud data comprises at least one piece of 3D laser point data which comprises a 3D coordinate and a reflection value.

In this embodiment, the information related to the grid map for generating the high precision map may be stored locally in an electronic device on which the method for generating the high precision map runs, or stored in another electronic device connected to the electronic device. In this way, the electronic device may acquire, locally or remotely, information related to the grid map for generating the high precision map. Specifically, the grid map is formed of grid images arranged in M rows and N columns, each of the grid images having an equivalent size, both M and N being positive integers. The information related to the grid map comprises: a row number and a column number of the grid map; a unit pixel length of the grid map indicating a physical length represented by one pixel in the grid map; and a horizontal pixel number and a vertical pixel number of each of the grid images in the grid map. For example, the unit pixel length of the grid map being 3 cm means that the physical length represented by each pixel in the grid map is 3 cm. Theoretically, a smaller unit pixel length of the grid map results in a higher precision of the generated high precision map. However, an excessively small unit pixel length may result in increased amount of data to be calculated.

At step 102, according to the 3D coordinate of the 3D laser point data and the information related to the grid map, position information of each piece of the 3D laser point data of the 3D laser point cloud data in the grid map is determined.

In this embodiment, the electronic device may determine the position information of each piece of the 3D laser point data of the 3D laser point cloud data in the grid map according to the 3D coordinate of the 3D laser point data, as well as the row numbers and the column numbers of the grid map, the unit pixel length of the grid map, and the horizontal pixel numbers and the vertical pixel numbers of each of the grid images in the grid map acquired at step 101. The position information of the 3D laser point data in the grid map comprises a row value and a column value of the grid image, where the 3D laser point data is located, in the grid map, and a coordinate of the 3D laser point data in the grid map.

In some alternative implementations of this embodiment, the electronic device may establish a world coordinate system before step 101. The 3D coordinate of the 3D laser point cloud data, the coordinate of the grid map and the coordinate of the high precision map to be generated are coordinates based on the world coordinate system. In this way, the electronic device may first acquire a coordinate of an origin of the world coordinate system, and then determine the position information of each piece of the 3D laser point data of the 3D laser point cloud data in the grid map according to the following formulas:

$$r=[(y-y_{origin})\div(dis_{pix}\times h_{pix})]+1,$$

$$c=[(x-x_{origin})\div(dis_{pix}\times w_{pix})]+1,$$

$$i=[(x-x_{origin})\div dis_{pix}]+1,$$

$$j=[(y-y_{origin})\div dis_{pix}]+1,$$

$$u=i\%\ w_{pix},\text{ and}$$

$$v=h_{pix}-j\%\ h_{pix}.$$

In the above formulas, x and y are respectively an abscissa and an ordinate in the 3D coordinate of the 3D laser point data; r and c are respectively the row value and the column value of the grid image, where the 3D laser point data is located, in the grid map obtained through a calculation; i and j are respectively an abscissa and an ordinate of the 3D laser point data in the grid map obtained through a calculation; u and v are respectively an abscissa and an ordinate of a pixel point, corresponding to the coordinate (i, j) in the grid map, in a grid image indicated by row r and column c; and x, y, r, c, i, j, u and v are all positive integers, u being a positive integer ranging from 1 to $w_{pix}$, and v being a positive integer ranging from 1 to $h_{pix}$. The coordinate origin of the grid image is located at an upper left corner of the grid image, and the coordinate origin of the grid map is located at a lower left corner, $x_{origin}$ and $y_{origin}$ being respectively an abscissa and an ordinate of the origin of the world coordinate system, $w_{pix}$ and $h_{pix}$ being respectively the horizontal pixel number and the vertical pixel number of the grid image in the grid map, and $dis_{pix}$ being the unit pixel length of the grid map.

In the present application, $[(y-y_{origin})\div(dis_{pix}\times h_{pix})]$ indicates that a result obtained by dividing $(y-y_{origin}$ by $(dis_{pix}\times h_{pix})$ is rounded down. $[(x-x_{origin})+(dis_{pix}\times w_{pix})]$ indicates that a result obtained by dividing $(x-x_{origin})$ by $(dis_{pix}\times w_{pix})$ is rounded down. $[(x-x_{origin}\div dis_{pix}]$ indicates that a result obtained by dividing $(x-x_{origin})$ by $dis_{pix}$ is rounded down. $[(y-y_{origin})\div dis_{pix}]$ indicates that a result obtained by dividing $(y-y_{origin})$ by $dis_{pix}$ is rounded down. i % $w_{pix}$ indicates a remainder obtained by dividing i by $w_{pix}$. j % $h_{pix}$ indicates a remainder obtained by dividing j by $h_{pix}$.

In some alternative implementations of this embodiment, the world coordinate system may be a Universal Transverse Mercartor (UTM) world coordinate system.

At step 103, each pixel point in each of the grid images in the grid map is rendered, by using the reflection value of 3D laser point data of the 3D laser point cloud data having an equivalent coordinate in the grid map as the coordinate of the pixel point, in order to generate each of grid images in the grid map.

In this embodiment, the electronic device may render each pixel point in each of the grid images in the grid map, by using the reflection value of 3D laser point data of the 3D laser point cloud data having an equivalent coordinate in the grid map as the coordinate of the pixel point, in order to generate each of grid images in the grid map. Specifically, for each pixel point in each of the grid images in the grid map, if the number of 3D laser point data, whose coordinate in the grid map is identical to the coordinate of the pixel, of the 3D laser point cloud data is one, a reflection value of the 3D laser point data is directly utilized to render the pixel point. If the number of 3D laser point data, whose coordinate in the grid map is identical to the coordinate of the pixel, of the 3D laser point cloud data is greater than one, a reflection value for rendering the pixel point may be calculated by using various methods. For example, an average value of reflection values of multiple pieces of the 3D laser point data, whose coordinates in the grid map are identical to the coordinate of the pixel point, of the 3D laser point cloud data may be used as the reflection value for rendering the pixel point. Alternatively, noise filtering may be performed on the multiple pieces of the 3D laser point data, whose coordinates in the grid map are identical to the coordinate of the pixel point, of the 3D laser point cloud data to denoise the 3D laser point data, and an average value of reflection values of the multiple pieces of the 3D laser point data after denoising is used as the reflection value for rendering the pixel point.

In some alternative implementations of this embodiment, the reflection value may be a color value and/or a brightness value. For example, the reflection value may be a brightness value of three primary colors, such as red, green and blue in the Red Green Blue (RGB) color mode. The reflection value may also be a hue value, a saturation value or a lightness value in the Hue Saturation Value (HSV) color mode. The reflection value may also be a hue value, a saturation value or a lightness value in the Hue Saturation Lightness (HSL) color mode.

At step 104, traffic information of each of the grid images in the grid map is identified by using a machine learning algorithm.

In this embodiment, the electronic device may identify, by using a machine learning algorithm, traffic information of each of the grid images in the grid map. Specifically, the traffic information comprises at least one of road shape information, road slope information, road curvature information, road direction information, lane width information, crash barrier information, road border information, lane marking information, and guiding line information.

In this embodiment, the electronic device may train, by using a background-truth grid image, a traffic information identification model to obtain parameters and outputs of the identification model. During identification, each of the grid images in the grid map after being rendered at step 103 is input to the model, and a corresponding traffic information identification result is output. Taking the identification to the lane markings in the traffic information as an example, long lines in the grid image may be identified by using a Hough transformation. The Hough transformation is a parameter determination method based on a voting mechanism. First, points containing edge features in the image are extracted by using an edge extraction method, and parameters of lines are determined to extract multiple lines in the grid image. Then, the identification model is trained by using features such as the length of the lines, a relation of the distance between the lines and the width of the vehicle, and the width of the lane markings.

In some alternative implementations of this embodiment, the machine learning algorithm is a full convolutional neural network algorithm.

At step 105, the traffic information of each of the grid images in the grid map is clustered, by using a machine learning algorithm in combination with position relations among each of the grid images in the grid map, in order to obtain the traffic information of the grid map.

In this embodiment, only local traffic information of each of the grid images is obtained at step 104. Therefore, based on the traffic information of the grid images in the grid map identified at step 104, the electronic device may cluster, by using the machine learning algorithm in combination with position relations among each of the grid images in the grid map, the traffic information of each of the grid images in the grid map, in order to obtain the traffic information of the grid map. The position relation among the grid images refers to a position relation that can be determined according to the row value and the column value of each of the grid images. For example, two grid images having adjacent row values are vertically adjacent, and two grid images having adjacent column values are horizontally adjacent. For four grid images whose row values and column values are (r, c), (r, c+1), (r+1, c) and (r+1, c+1), a larger grid image in a rectangular shape may be formed by the four grid images, in which the row value and the column value at the upper left corner is (r+1, c), the row value and the column value at the upper right corner is (r+1, c+1), the row value and the column value at the lower left corner is (r, c), the row value and the column value at the lower right corner is (r, c+1), wherein, r and c are both positive integers, r and r+1 both indicate row values of the grid images, and c and c+1 both indicate column values of the grid images. The clustering algorithm may implemented by various clustering algorithms, such as K-MEANS algorithm, K-MEDOIDS algorithm, CLARANS algorithm, BIRCH algorithm, CURE algorithm, CHAMELEON algorithm, DBSCAN algorithm, an OPTICS algorithm, DENCLUE algorithm, STING algorithm, CLIQUE algorithm, WAVE-CLUSTER algorithm, and a model-based method (for example, a statistical method and a neural network method).

At step 106, the traffic information of the grid map is loaded into the grid map to generate the high precision map.

In this embodiment, the electronic device may load the traffic information of the grid map acquired at step 105 into the grid map to generate the high precision map.

According to the method provided in the above embodiments of the present application, a high precision map is generated by mapping the 3D laser point cloud data to each of the grid images of the grid map, extracting the traffic information in the grid map, and loading the traffic information into the grid map. Therefore, the generating of the high precision map with a high precision and a plurality of dimensions is implemented. Further referring to FIG. 2, it shows a flowchart 200 of a method for generating a high precision map according to another embodiment. The method for generating the high precision map illustrated by the flowchart 200 comprises the following steps: At step 201, 3D laser point cloud data for generating the high precision map and information related to a grid map for generating the high precision map are acquired.

In this embodiment, the 3D laser point cloud data for generating the high precision map may be captured and processed by a laser scanner, and then stored locally in an electronic device on which the method for generating the high precision map runs, or stored in another electronic device connected to the electronic device. In this way, the electronic device may acquire, locally or remotely, the 3D laser point cloud data for generating the high precision map. Specifically, the 3D laser point cloud data comprises at least one piece of 3D laser point data which comprises a 3D coordinate and a reflection value.

In this embodiment, the information related to the grid map for generating the high precision map may be stored locally in an electronic device on which the method for generating the high precision map runs, or stored in another electronic device connected to the electronic device. In this way, the electronic device may acquire, locally or remotely, information related to the grid map for generating the high precision map. Specifically, the grid map is formed of grid images arranged in M rows and N columns, each of the grid images having an equivalent size, both M and N being positive integers. The information related to the grid map comprises: a row number and a column number of the grid map; a unit pixel length of the grid map indicating a physical length represented by one pixel in the grid map; and a horizontal pixel number and a vertical pixel number of each of the grid images in the grid map.

At step 202, according to the 3D coordinate of the 3D laser point data and the information related to the grid map, position information of each piece of the 3D laser point data of the 3D laser point cloud data in the grid map is determined.

In this embodiment, the electronic device may determine the position information of each piece of the 3D laser point data of the 3D laser point cloud data in the grid map according to the 3D coordinate of the 3D laser point data, as well as the row numbers and the column numbers of the grid map, the unit pixel length of the grid map, and the horizontal pixel numbers and the vertical pixel numbers of each of the grid images in the grid map acquired at step 201. The position information of the 3D laser point data in the grid map comprises a row value and a column value of the grid image, where the 3D laser point data is located, in the grid map, and a coordinate of the 3D laser point data in the grid map.

Step 203, each pixel point in each of the grid images in the grid map is rendered, by using the reflection value of 3D laser point data of the 3D laser point cloud data having an equivalent coordinate in the grid map as the coordinate of the pixel point, in order to generate each of grid images in the grid map.

In this embodiment, the electronic device may render each pixel point in each of the grid images in the grid map, by using the reflection value of 3D laser point data of the 3D laser point cloud data having an equivalent coordinate in the grid map as the coordinate of the pixel point, in order to generate each of grid images in the grid map. Specifically, for each pixel point in each of the grid images in the grid map, if the number of 3D laser point data, whose coordinate in the grid map is identical to the coordinate of the pixel, of the 3D laser point cloud data is one, a reflection value of the 3D laser point data is directly utilized to render the pixel point. If the number of 3D laser point data, whose coordinate in the grid map is identical to the coordinate of the pixel, of the 3D laser point cloud data is greater than one, a reflection value for rendering the pixel point may be calculated by using various methods.

Step 204, traffic information of each of the grid images in the grid map is identified by using a machine learning algorithm.

In this embodiment, the electronic device may identify, by using a machine learning algorithm, traffic information of each of the grid images in the grid map. Specifically, the traffic information comprises at least one of road shape information, road slope information, road curvature information, road direction information, lane width information, crash barrier information, road border information, lane marking information, and guiding line information.

In this embodiment, the electronic device may train, by using a background-truth grid image, a traffic information identification model to obtain parameters and outputs of the identification model. During identification, each of the grid images in the grid map after being rendered at step 203 is input to the model, and a corresponding traffic information identification result is output.

At step 205, at least one different unit pixel length for the grid map is set in order to generate the grid map with the at least one different unit pixel length.

In this embodiment, the electronic device may set at least one different unit pixel length for the grid map to generate the grid map with the at least one different unit pixel length.

As an example, the original grid map is formed of grid images arranged in 10 rows and 10 columns. Each of the grid images is formed of 100×100 pixels. The unit pixel length is 0.1 m.

The area that can be represented by each of the grid image is in range of 10 m*10 m. Then, a new unit pixel length for the grid map is set to be 0.2 m. In this way, a grid map with a new grid unit pixel length of 0.2 m is obtained. The new unit pixel length of the grid map is twice of the original one.

Therefore, the physical length that can be represented by each of the grid images in the new grid map is twice of the original one.

At step 206, the traffic information of each of the grid images in the grid map with the at least one different unit pixel length is clustered, by using the machine learning algorithm in combination with the position relations among each of the grid images, in order to obtain the traffic information of the grid map and coordinate data in the traffic information.

In this embodiment, as for each of the grid maps among the grid maps with the at least one different unit pixel length generated at step 205, the electronic device may cluster by using the machine learning algorithm in combination with the position relations among each of the grid images in the grid map, the traffic information of each of the grid images in the grid map in order to obtain the traffic information of the grid map. The traffic information of each of the grid maps among the grid maps with the at least one different unit pixel length is clustered by using the machine learning algorithm in order to obtain the traffic information of the final grid map. The clustering algorithm may be implemented in various clustering algorithms.

Since the grid images in the grid maps with the at least one different unit pixel length have different unit pixel lengths, the physical length expressed by each pixel can be varied. As a result, the physical length expressed by a single grid image in the grid maps with different unit pixel lengths can be varied. In this way, traffic information distributed in different grid images of one grid map may be distributed in one grid image of another grid map. Therefore, traffic information in different grid images may be clustered to give out new traffic information.

Step 207, the traffic information of the grid map is loaded into the grid map to generate the high precision map.

In this embodiment, the electronic device may load the traffic information of the grid map acquired at step 206 into the grid map to generate the high precision map.

Figure 2:
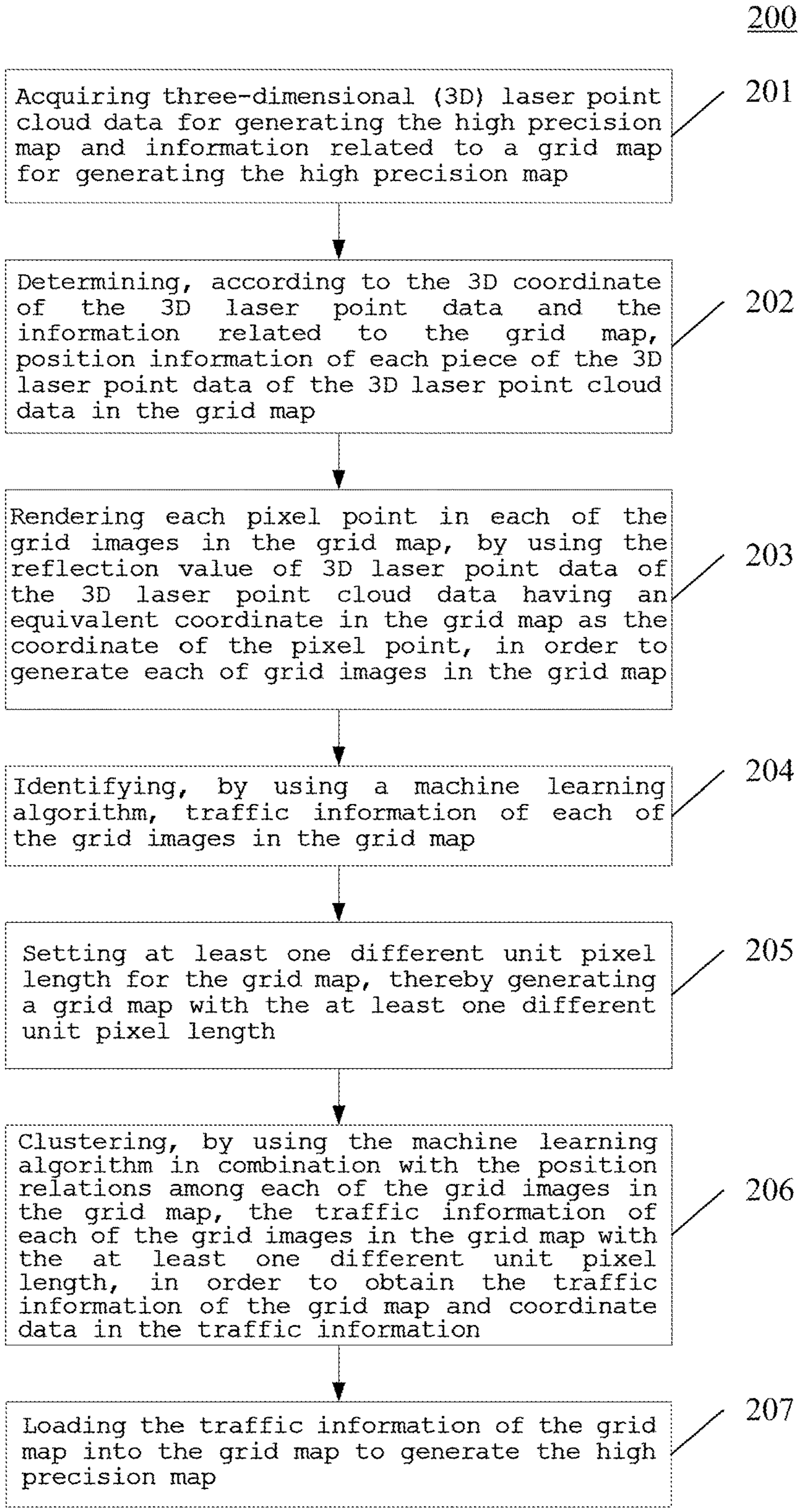
FIG. 2 is a flow chart of a method for generating a high precision map according to another embodiment of the present application.

It can be seen from FIG. 2 that, compared with the embodiment corresponding to FIG. 1, the method for generating a high precision map illustrated by the flowchart 200 in this embodiment take the step of setting different unit pixel lengths for the grid map into account. Therefore, the technical solution provided in this embodiment can introduce more scales into the grid maps, and thus implement the generating of a high precision map with a higher precision.

Figure 3A:
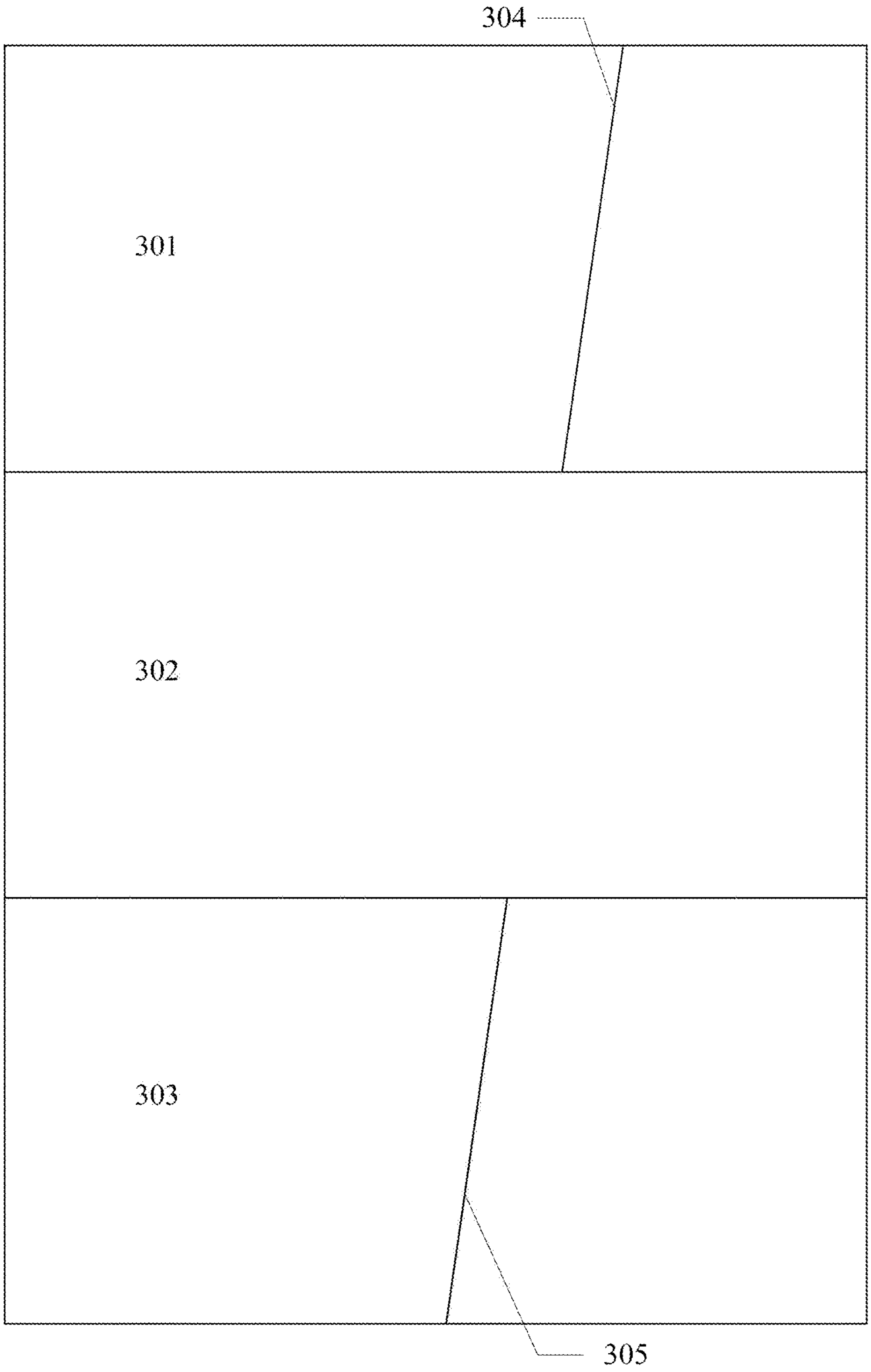
FIGS. 3*a* and 3*b* are schematic diagrams showing the effect of a traffic information clustering result.
Figure 3B:
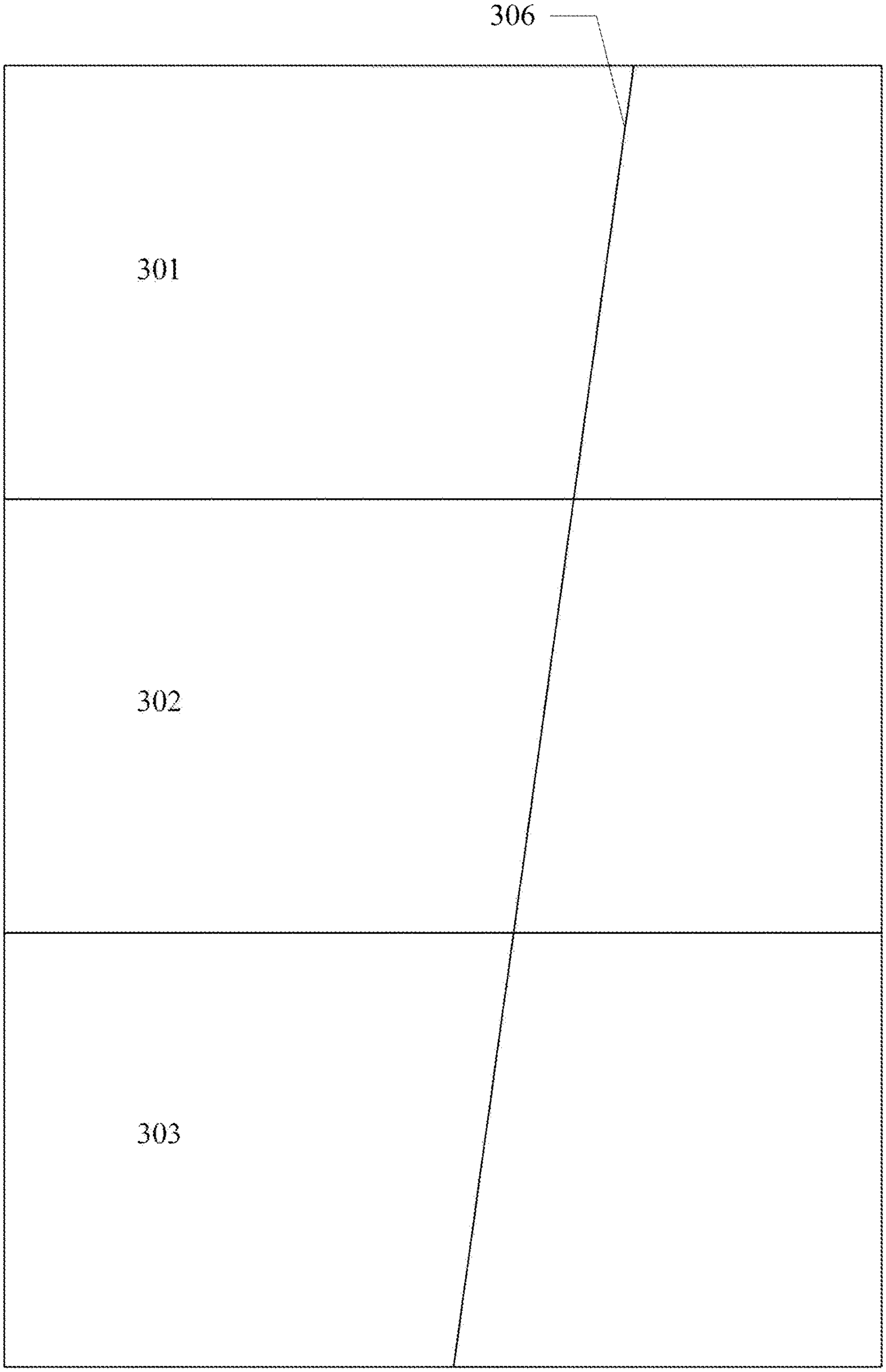

Reference is further made to FIG. 3*a* and FIG. 3*b*, which show schematic diagrams of processing effects of steps 205-206 in the present application. In FIG. 3*a*, icons 301, 302 and 303 are three spatially continuous grid images. A same lane marking penetrates through 301, 302 and 303. However, according to an identification result acquired at step 204, only a lane marking 304 is identified in the grid image 301 and a lane marking 305 is identified in the grid image 303. In contrast, no lane marking is identified in the grid image 302. After the clustering processing at step 205 and 206, the lane marking 304 is combined with the lane marking 305, so as to generate a new longer lane marking 306 as shown in FIG. 3*b*.

Figure 4:
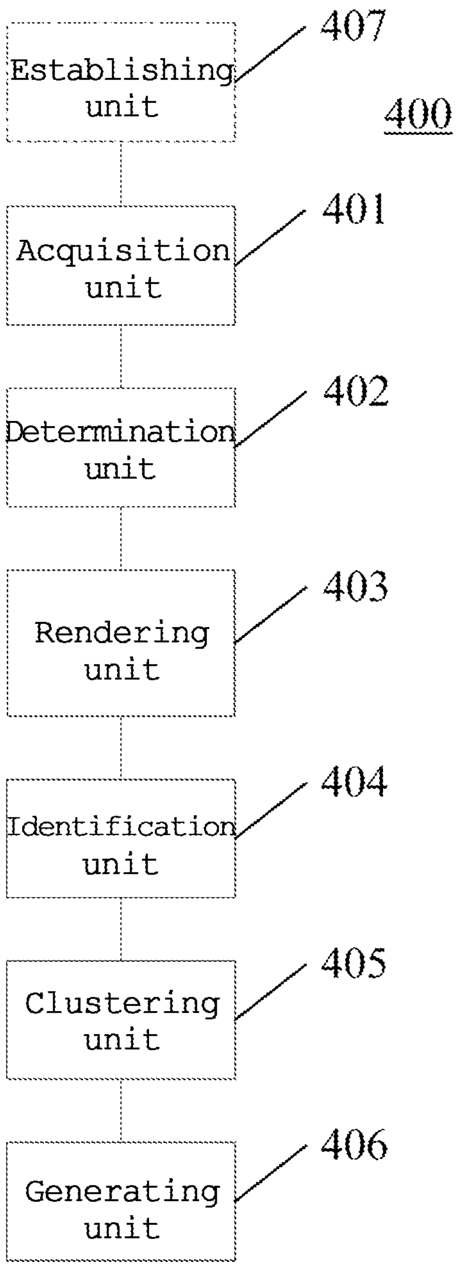
FIG. 4 is a schematic structural diagram of an apparatus for generating a high precision map according to an embodiment of the present application.

Reference is further made to FIG. 4. As an implementation of the methods illustrated in the above drawings, the present application provides an embodiment of an apparatus for generating a high precision map. The apparatus embodiment is corresponding to the method embodiment shown in FIG. 2. Specifically, the apparatus is applicable to various electronic devices.

As shown in FIG. 4, the apparatus 400 for generating a high precision map in this embodiment comprises: an acquisition unit 401, a determination unit 402, a rendering unit 403, an identification unit 404, a clustering unit 405, and a generating unit 406. The acquisition unit 401 is configured to acquire three-dimensional (3D) laser point cloud data for generating the high precision map and information related to a grid map for generating the high precision map. The 3D laser point cloud data comprises at least one piece of 3D laser point data containing a 3D coordinate and a reflection value. The grid map are formed of grid images arranged in M rows and N columns, each of the grid images having an equivalent size, both M and N being positive integers. The information related to the grid map comprises: a row number and a column number of the grid map; a unit pixel length of the grid map indicating a physical length represented by one pixel in the grid map; and a horizontal pixel number and a vertical pixel number of each of the grid images in the grid map. The determination unit 402 is configured to determine, according to the 3D coordinate of the 3D laser point data and the information related to the grid map, position information of each piece of the 3D laser point data of the 3D laser point cloud data in the grid map. The position information comprises: a row value and a column value of a grid image, where the 3D laser point data is located, in the grid map; and a coordinate of the 3D laser point data in the grid map. The rendering unit 403 is configured to render each pixel point in each of the grid images in the grid map, by using the reflection value of 3D laser point data of the 3D laser point cloud data having an equivalent coordinate in the grid map as the coordinate of the pixel point, in order to generate each of grid images in the grid map. The identification unit 404 is configured to identify, by using a machine learning algorithm, traffic information of each of the grid images in the grid map. The traffic information comprises at least one of road shape information, road slope information, road curvature information, road direction information, lane width information, crash barrier information, road border information, lane marking information, and guiding line information. The clustering unit 405 is configured to cluster, by using a machine learning algorithm in combination with position relations among each of the grid images in the grid map, the traffic information of each of the grid images in the grid map, in order to obtain the traffic information of the grid map. The generating unit 406 is configured to load the traffic information of the grid map into the grid map to generate the high precision map.

In this embodiment, the 3D laser point cloud data for generating the high precision map may be captured and processed by a laser scanner, and then stored locally in an electronic device on which the apparatus 400 for generating the high precision map runs, or stored in another electronic device connected to the electronic device. In this way, the acquisition unit 401 may acquire, locally or remotely, the 3D laser point cloud data for generating the high precision map. Specifically, the 3D laser point cloud data comprises at least one piece of 3D laser point data which comprises a 3D coordinate and a reflection value.

In this embodiment, the information related to the grid map for generating the high precision map may be stored locally in an electronic device on which the apparatus 400 for generating the high precision map runs, or stored in another electronic device connected to the electronic device. In this way, the acquisition unit 401 may acquire, locally or remotely, information related to the grid map for generating the high precision map. Specifically, the grid map is formed of grid images arranged in M rows and N columns, each of the grid images having an equivalent size, both M and N being positive integers.

The information related to the grid map comprises: a row number and a column number of the grid map; a unit pixel length of the grid map indicating a physical length represented by one pixel in the grid map; and a horizontal pixel number and a vertical pixel number of each of the grid images in the grid map. For example, the unit pixel length of the grid map being 3 cm means that the physical length represented by each pixel in the grid map is 3 cm. Theoretically, a smaller unit pixel length of the grid map results in a higher precision of the generated high precision map. However, an excessively small unit pixel length may result in increased amount of data to be calculated.

In this embodiment, the determination unit 402 may determine the position information of each piece of the 3D laser point data of the 3D laser point cloud data in the grid map according to the 3D coordinate of the 3D laser point data, as well as the row numbers and the column numbers of the grid map, the unit pixel length of the grid map, and the horizontal pixel numbers and the vertical pixel numbers of each of the grid images in the grid map acquired by the acquisition unit 401. The position information of the 3D laser point data in the grid map comprises a row value and a column value of the grid image, where the 3D laser point data is located, in the grid map, and a coordinate of the 3D laser point data in the grid map.

In this embodiment, the rendering unit 403 of the apparatus 400 for generating the high precision map may render each pixel point in each of the grid images in the grid map, by using the reflection value of 3D laser point data of the 3D laser point cloud data having an equivalent coordinate in the grid map as the coordinate of the pixel point, in order to generate each of grid images in the grid map. Specifically, for each pixel point in each of the grid images in the grid map, if the number of 3D laser point data, whose coordinate in the grid map is identical to the coordinate of the pixel, of the 3D laser point cloud data is one, a reflection value of the 3D laser point data is directly utilized to render the pixel point. If the number of 3D laser point data, whose coordinate in the grid map is identical to the coordinate of the pixel, of the 3D laser point cloud data is greater than one, a reflection value for rendering the pixel point may be calculated by using various methods.

In this embodiment, the identification unit 404 may identify, by using a machine learning algorithm, traffic information of each of the grid images in the grid map. Specifically, the traffic information comprises at least one of road shape information, road slope information, road curvature information, road direction information, lane width information, crash barrier information, road border information, lane marking information, and guiding line information.

In this embodiment, the identification unit 404 may train, by using a background-truth grid image, a traffic information identification model to obtain parameters and outputs of the identification model. During identification, each of the grid images in the grid map after being rendered by the rendering unit 403 is input to the model, and a corresponding traffic information identification result is output.

In this embodiment, based on the identification result of the identification unit 404, the clustering unit 405 may cluster, by using the machine learning algorithm in combination with position relations among each of the grid images, the traffic information of each of the grid images, in order to obtain the traffic information of the grid map. The position relation among the grid images refers to a position relation that can be determined according to the row value and the column value of each of the grid images.

In this embodiment, the generating unit 406 may load the traffic information of the grid map acquired by the clustering unit 405 into the grid map to generate the high precision map.

In some alternative implementations of this embodiment, the apparatus 400 for generating the high precision map may further comprise an establishing unit 407 configured to establish a world coordinate system.

In some alternative implementations of this embodiment, the 3D coordinate of the 3D laser point cloud data, the coordinate of the grid map and the coordinate of the high precision map are coordinates based on the world coordinate system.

In some alternative implementations of this embodiment, the determination unit 402 is further configured to: acquire the coordinate of an origin of the world coordinate system; and determine position information of each piece of the 3D laser point data of the 3D laser point cloud data in the grid map according to the following formulas.

$$r=[(y-y_{origin})\div(dis_{pix}\times h_{pix})]+1,$$

$$c=[(x-x_{origin})\div(dis_{pix}\times w_{pix})]+1,$$

$$i=[(x-x_{origin})\div dis_{pix}]+1,$$

$$j=[(y-y_{origin})\div dis_{pix}]+1,$$

$$u=i\%\ w_{pix},\text{ and}$$

$$v=h_{pix}-j\%\ h_{pix}.$$

In the above formulas, x and y are respectively an abscissa and an ordinate in the 3D coordinate of the 3D laser point data; r and c are respectively the row value and the column value of the grid image, where the 3D laser point data is located, in the grid map obtained through a calculation; i and j are respectively an abscissa and an ordinate of the 3D laser point data in the grid map obtained through a calculation; u and v are respectively an abscissa and an ordinate of a pixel point, corresponding to the coordinate (i, j) in the grid map, in a grid image indicated by row r and column c; and x, y, r, c, i, j, u and v are all positive integers, u being a positive integer ranging from 1 to $w_{pix}$, and v being a positive integer ranging from 1 to $h_{pix}$. The coordinate origin of the grid image is located at an upper left corner of the grid image, and the coordinate origin of the grid map is located at a lower left corner, $x_{origin}$ and $y_{origin}$ being respectively an abscissa and an ordinate of the origin of the world coordinate system, $w_{pix}$ and $h_{pix}$ being respectively the horizontal pixel number and the vertical pixel number of the grid image in the grid map, and $dis_{pix}$ being the unit pixel length of the grid map.

In some alternative implementations of this embodiment, the clustering unit 405 is further configured to: set at least one different unit pixel length for the grid map, thereby generating a grid map with at least one different unit pixel length; and cluster, by using the machine learning algorithm in combination with the position relations among each of the grid images in the grid map with the at least one different unit pixel length, the traffic information of each of the grid images in the grid map with the at least one different unit pixel length, in order to obtain the traffic information of the grid map and coordinate data in the traffic information.

In some alternative implementations of this embodiment, the machine learning algorithm is a full convolutional neural network algorithm.

In some alternative implementations of this embodiment, the reflection value of the 3D point cloud data may be a color value and/or a brightness value.

In some alternative implementations of this embodiment, the world coordinate system may be a UTM world coordinate system.

Figure 5:
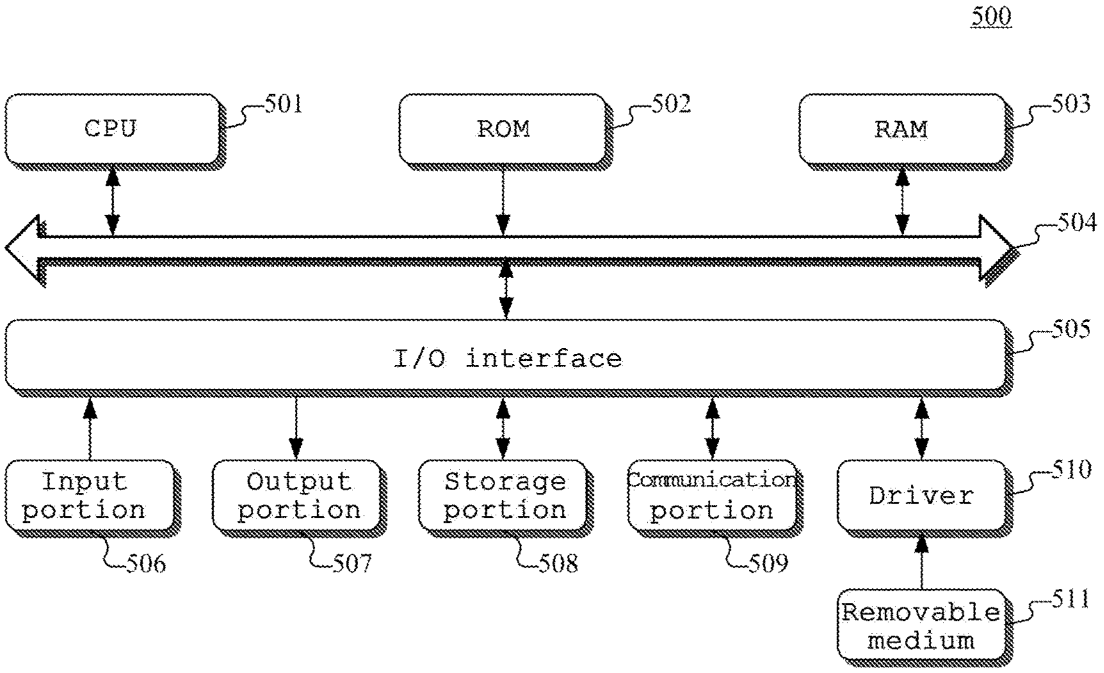
FIG. 5 is a schematic structural diagram of a computer system of a terminal device adapted to implement embodiments of the present application.

Reference is made to FIG. 5, which illustrates a schematic structural diagram of a computer system 500 adapted to implement the terminal device according to the embodiments of the present application.

As shown in FIG. 5, the computer system 500 includes a central processing unit (CPU) 501, which may execute various appropriate actions and processes in accordance with a program stored in a read-only memory (ROM) 502 or a program loaded into a random access memory (RAM) 503 from a storage portion 508. The RAM 503 also stores various programs and data required by operations of the system 500. The CPU 501, the ROM 502 and the RAM 503 are connected to each other through a bus 504. An input/output (I/O) interface 505 is also connected to the bus 504.

The following components are connected to the I/O interface 505: an input portion 506 including a keyboard, a mouse etc.; an output portion 507 comprising a cathode ray tube (CRT), a liquid crystal display device (LCD), a speaker etc.; a storage portion 508 including a hard disk and the like; and a communication portion 509 comprising a network interface card, such as a LAN card and a modem. The communication portion 509 performs communication processes via a network, such as the Internet. A driver 510 is also connected to the I/O interface 505 as required. A removable medium 511, such as a magnetic disk, an optical disk, a magneto-optical disk, and a semiconductor memory, may be installed on the driver 510, to facilitate the retrieval of a computer program from the removable medium 511, and the installation thereof on the storage portion 508 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method of the flow chart. In such an embodiment, the computer program may be downloaded and installed from a network via the communication portion 509, and/or may be installed from the removable media 511. When the computer program is executed by the CPU 501, the above function defined by the method of the present application is implemented.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units according to the embodiments of the present application may be implemented by softwares or hardwares. The described units may be disposed in the processors. For example, a following description may be made. A processor comprises an acquisition unit, a determination unit, a rendering unit, an identification unit, a clustering unit, and a generating unit. The names of these units are not intended to limit the corresponding units. For example, the generating unit may also be referred to as a unit for generating a high precision map.

In another aspect, the present application further provides a nonvolatile computer storage medium. The nonvolatile computer storage medium may be the nonvolatile computer storage medium included in the apparatus in the above embodiments, or a stand-alone nonvolatile computer storage medium which has not been assembled into the apparatus. The nonvolatile computer storage medium stores one or more programs. When the one or more programs are executed by an apparatus, the apparatus is caused to perform: acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising: a row number and a column number of the grid map; a unit pixel length of the grid map indicating a physical length represented by one pixel in the grid map; and a horizontal pixel number and a vertical pixel number of each of the grid images in the grid map; determining, according to the 3D coordinate of the 3D laser point data and the information related to the grid map, position information of each piece of the 3D laser point data of the 3D laser point cloud data in the grid map, the position information comprising: a row value and a column value of a grid image, where the 3D laser point data is located, in the grid map; and a coordinate of the 3D laser point data in the grid map; rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map; identifying, by using a machine learning algorithm, traffic information of each of the grid images in the grid map, the traffic information comprising at least one of road shape information, road slope information, road curvature information, road direction information, lane width information, crash barrier information, road border information, lane marking information, and guiding line information; clustering, by using a machine learning algorithm in combination with position relations among each of the grid images in the grid map, the traffic information of each of the grid images in the grid map, in order to obtain the traffic information of the grid map; and loading the traffic information of the grid map into the grid map to generate the high precision map.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for generating a high precision map, the method comprising:

acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising:

a row number and a column number of the grid map;

a unit pixel length of the grid map indicating a physical length represented by one pixel in the grid map; and a horizontal pixel number and a vertical pixel number of each of the grid images in the grid map;

determining, according to the 3D coordinate of the 3D laser point data and the information related to the grid map, position information of each piece of the 3D laser point data of the 3D laser point cloud data in the grid map, the position information comprising:

a row value and a column value of a grid image, where the 3D laser point data is located, in the grid map; and a coordinate of the 3D laser point data in the grid map;

rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map;

identifying, by using a machine learning algorithm, road information of each of the grid images in the grid map, the road information comprising at least one of road shape information, road slope information, road curvature information, road direction information, lane width information, crash barrier information, road border information, lane marking information, and guiding line information;

clustering, by using a machine learning algorithm in combination with position relations among each of the grid images in the grid map, the road information of each of the grid images in the grid map, in order to obtain the road information of the grid map, comprising setting at least one different unit pixel length for the grid map to generate the grid map with the at least one different unit pixel length; and clustering, by using the machine learning algorithm in combination with the position relations among each of the grid images in the grid map with the at least one different unit pixel length, the road information of each of the grid images in the grid map with the at least one different unit pixel length, in order to obtain the road information of the grid map and coordinate data in the road information; and loading the road information of the grid map into the grid map to generate the high precision map.

2. The method of claim 1, the method further comprising:

establishing a world coordinate system before acquiring the 3D laser point cloud data for generating the high precision map and the information related to the grid map for generating the high precision map.

3. The method of claim 2, wherein the 3D coordinate of the 3D laser point data, the coordinate of the grid map and a coordinate of the high precision map are coordinates based on the world coordinate system.

4. The method of claim 3, the determining, according to the 3D coordinate of the 3D laser point data and the information related to the grid map, position information of each piece of the 3D laser point data of the 3D laser point cloud data in the grid map comprising:

acquiring a coordinate of an origin of the world coordinate system; and determining the position information of each piece of the 3D laser point data of the 3D laser point cloud data in the grid map according to following formulas:

$$r=[(y-y_{origin})\div(dis_{pix}\times h_{pix})]+1$$

$$c=[(x-x_{origin})\div(dis_{pix}\times w_{pix})]+1$$

$$i=[(x-x_{origin})\div dis_{pix}]+1$$

$$j=[(y-y_{origin})\div dis_{pix}]+1$$

$$u=i\% w_{pix}$$

$$v=h_{pix}-j\% h_{pix}$$

wherein x and y are respectively an abscissa and an ordinate in the 3D coordinate of the 3D laser point data; r and c are respectively the row value and the column value of the grid image, where the 3D laser point data is located, in the grid map obtained through a calculation; i and j are respectively an abscissa and an ordinate of the 3D laser point data in the grid map obtained through a calculation; u and v are respectively an abscissa and an ordinate of a pixel point, corresponding to the coordinate (i, j) in the grid map, in a grid image indicated by row r and column c; and x, y, r, c, i, j, u and v are all positive integers, u being a positive integer ranging from 1 to $w_{pix}$, and v being a positive integer ranging from 1 to $h_{pix}$, and wherein a coordinate origin of the grid image is located at an upper left corner of the grid image, and a coordinate origin of the grid map is located at a lower left corner, $x_{origin}$ and $y_{origin}$ being respectively an abscissa and an ordinate of the origin of the world coordinate system, $w_{pix}$ and $h_{pix}$ being respectively the horizontal pixel number and the vertical pixel number of the grid image in the grid map, and $dis_{pix}$ being the unit pixel length of the grid map.

5. The method of claim 1, wherein the machine learning algorithm is a full convolutional neural network algorithm.

6. The method of claim 1, wherein the reflection value is a color value or a brightness value.

7. The method of claim 2, wherein the world coordinate system is a Universal Transverse Mercator (UTM) world coordinate system.

8. An apparatus for generating a high precision map, the apparatus comprising:

at least one processor; and a memory storing instructions, which when executed by the at least one processor, cause the at least one processor to perform operations, the operations comprising:

acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising:

a row number and a column number of the grid map;

a unit pixel length of the grid map indicating a physical length represented by one pixel in the grid map; and a horizontal pixel number and a vertical pixel number of each of the grid images in the grid map;

determining, according to the 3D coordinate of the 3D laser point data and the information related to the grid map, position information of each piece of the 3D laser point data of the 3D laser point cloud data in the grid map, the position information comprising:

a row value and a column value of a grid image, where the 3D laser point data is located, in the grid map; and a coordinate of the 3D laser point data in the grid map;

rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map;

identifying, by using a machine learning algorithm, road information of each of the grid images in the grid map, the road information comprising at least one of road shape information, road slope information, road curvature information, road direction information, lane width information, crash barrier information, road border information, lane marking information, and guiding line information;

clustering, by using a machine learning algorithm in combination with position relations among each of the grid images in the grid map, the road information of each of the grid images in the grid map, in order to obtain the road information of the grid map, comprising setting at least one different unit pixel length for the grid map to generate the grid map with the at least one different unit pixel length; and clustering, by using the machine learning algorithm in combination with the position relations among each of the grid images in the grid map with the at least one different unit pixel length, the road information of each of the grid images in the grid map with the at least one different unit pixel length, in order to obtain the road information of the grid map and coordinate data in the road information; and loading the road information of the grid map into the grid map to generate the high precision map.

9. The apparatus of claim 8, wherein the operations further comprise establishing a world coordinate system before acquiring the 3D laser point cloud data for generating the high precision map and the information related to the grid map for generating the high precision map.

10. The apparatus of claim 9, wherein the 3D coordinate of the 3D laser point data, the coordinate of the grid map and a coordinate of the high precision map are coordinates based on the world coordinate system.

11. The apparatus of claim 10, wherein the determining, according to the 3D coordinate of the 3D laser point data and the information related to the grid map, position information of each piece of the 3D laser point data of the 3D laser point cloud data in the grid map further comprises:

acquiring a coordinate of an origin of the world coordinate system; and determining the position information of each piece of the 3D laser point data of the 3D laser point cloud data in the grid map according to following formulas:

$$r=[(y-y_{origin})\div(dis_{pix}\times h_{pix})]+1$$

$$c=[(x-x_{origin})\div(dis_{pix}\times w_{pix})]+1$$

$$i=[(x-x_{origin})\div dis_{pix}]+1$$

$$j=[(y-y_{origin})\div dis_{pix}]+1$$

$$u=i\%w_{pix}$$

$$v=h_{pix}-j\%h_{pix}$$

wherein x and y are respectively an abscissa and an ordinate in the 3D coordinate of the 3D laser point data; r and c are respectively the row value and the column value of the grid image, where the 3D laser point data is located, in the grid map obtained through a calculation; i and j are respectively an abscissa and an ordinate of the 3D laser point data in the grid map obtained through a calculation; u and v are respectively an abscissa and an ordinate of a pixel point, corresponding to the coordinate (i, j) in the grid map, in a grid image indicated by row r and column c; and x, y, r, c, i, j, u and v are all positive integers, u being a positive integer ranging from 1 to $w_{pix}$, and v being a positive integer ranging from 1 to $h_{pix}$, and wherein a coordinate origin of the grid image is located at an upper left corner of the grid image, and a coordinate origin of the grid map is located at a lower left corner, $x_{origin}$ and $y_{origin}$ being respectively an abscissa and an ordinate of the origin of the world coordinate system, $w_{pix}$ and $h_{pix}$ being respectively the horizontal pixel number and the vertical pixel number of the grid image in the grid map, and $dis_{pix}$ being the unit pixel length of the grid map.

12. The apparatus of claim 8, wherein the machine learning algorithm is a full convolutional neural network algorithm.

13. The apparatus of claim 8, wherein the reflection value is a color value or a brightness value.

14. The apparatus of claim 9, wherein the world coordinate system is a Universal Transverse Mercator (UTM) world coordinate system.

15. A non-transitory storage medium storing one or more programs, the one or more programs when executed by an apparatus, causing the apparatus to perform a method for generating a high precision map, comprising:

acquiring three-dimensional (3D) laser point cloud data for generating the high precision map and information related to a grid map for generating the high precision map, the 3D laser point cloud data comprising at least one piece of 3D laser point data containing a 3D coordinate and a reflection value, the grid map being formed of grid images arranged in M rows and N columns, each of the grid images having an equivalent size, both M and N being positive integers, the information related to the grid map comprising:

a row number and a column number of the grid map;

a unit pixel length of the grid map indicating a physical length represented by one pixel in the grid map; and a horizontal pixel number and a vertical pixel number of each of the grid images in the grid map;

determining, according to the 3D coordinate of the 3D laser point data and the information related to the grid map, position information of each piece of the 3D laser point data of the 3D laser point cloud data in the grid map, the position information comprising:

a row value and a column value of a grid image, where the 3D laser point data is located, in the grid map; and a coordinate of the 3D laser point data in the grid map;

rendering each pixel point in each of the grid images in the grid map, by using the reflection value of 3D laser point data of the 3D laser point cloud data having an equivalent coordinate in the grid map as the coordinate of the pixel point, in order to generate each of grid images in the grid map;

identifying, by using a machine learning algorithm, road information of each of the grid images in the grid map, the road information comprising at least one of road shape information, road slope information, road curvature information, road direction information, lane width information, crash barrier information, road border information, lane marking information, and guiding line information;

clustering, by using a machine learning algorithm in combination with position relations among each of the grid images in the grid map, the road information of each of the grid images in the grid map, in order to obtain the road information of the grid map, comprising setting at least one different unit pixel length for the grid map to generate the grid map with the at least one different unit pixel length; and clustering, by using the machine learning algorithm in combination with the position relations among each of the grid images in the grid map with the at least one different unit pixel length, the road information of each of the grid images in the grid map with the at least one different unit pixel length, in order to obtain the road information of the grid map and coordinate data in the road information; and loading the road information of the grid map into the grid map to generate the high precision map.

* * * * *